United States Patent [19]

Kuramoto et al.

[11] Patent Number: 5,420,240
[45] Date of Patent: May 30, 1995

[54] PROCESS FOR PURIFICATION OF SYNDIOTACTIC STYRENE POLYMER

[75] Inventors: Masahiko Kuramoto; Hideo Teshima, both of Ichihara, Japan

[73] Assignee: Idemitsu Kosan Co., Ltd., Tokyo, Japan

[21] Appl. No.: 216,181

[22] Filed: Mar. 21, 1994

Related U.S. Application Data

[60] Division of Ser. No. 964,560, Oct. 21, 1992, Pat. No. 5,321,122, which is a continuation of Ser. No. 556,940, Jul. 23, 1990, abandoned.

[30] Foreign Application Priority Data

Jul. 28, 1989 [JP] Japan .................................. 1-193877
Jul. 28, 1989 [JP] Japan .................................. 1-193880

[51] Int. Cl.$^6$ ............................................... C08F 6/28
[52] U.S. Cl. ..................................... 528/488; 528/495
[58] Field of Search ............................. 528/488, 495

[56] References Cited

U.S. PATENT DOCUMENTS

| | | | |
|---|---|---|---|
| 2,216,094 | 9/1940 | Britton et al. | 528/493 |
| 4,978,730 | 12/1990 | Maezawa et al. | 526/153 |
| 5,077,367 | 12/1991 | Campbell, Jr. et al. | 526/160 |
| 5,247,020 | 9/1993 | Nakano et al. | 525/249 |

FOREIGN PATENT DOCUMENTS

3425125  7/1984  Germany .

*Primary Examiner*—Joseph L. Schofer
*Assistant Examiner*—Tom Weber
*Attorney, Agent, or Firm*—Frishauf, Holtz, Goodman & Woodward

[57] ABSTRACT

A process for the purification of a styrene polymer having a high degree of syndiotactivity. The styrene polymer is obtained by carrying out polymerization with a catalyst comprising (A) an aluminoxane and (B) a transition metal compound, which does not contain halogen. The styrene polymer is deashed with an alcoholic alkaline solution and then washed with an alcohol.

15 Claims, No Drawings

PROCESS FOR PURIFICATION OF SYNDIOTACTIC STYRENE POLYMER

This is a division of application Ser. No. 07/964,560, filed Oct. 21, 1992, now U.S. Pat. No. 5,321,122, issued Jun. 14, 1994, which is a continuation of application Ser. No. 07/556,940, filed Jul. 23, 1990 (abandoned).

BACKGROUND OF THE INVENTION

1. Field of the Invention

This invention relates to a process for purification of a styrene polymer, more particularly, it relates to a process for purifying a styrene polymer having a high degree syndiotacticity in stereochemical structure of polymer chain with good efficiency and high purity.

2. Description of the Related Arts

Heretofore, a styrene polymer produced by the radical polymerization method has an atactic configuration in stereochemical structure, and it has been molded into various shapes by various molding methods such as injection molding, extrusion molding, blow molding, vacuum molding, cast molding, etc., end has widely been used for domestic electric appliances, office machines, household articles, packaging containers, toys, furnitures, synthetic papers, other industrial materials, etc.

However, the styrene polymer having atactic configuration has problems that it is inferior in heat resistance and chemical resistance.

The group of the present inventors have previously succeeded in developing a styrene polymer having a high degree of syndiotacticity, end further shown that a styrene polymer having syndiotactic configuration can be obtained by using a catalyst comprising e contacted product (alkylaluminoxane) of e transition metal compound end an organic aluminum compound with a condensing agent (Japanese Patent Application Laid-Open No. 187708/1987, No. 179906/1988 and No. 241009/1988).

According to the above methods, deashing and washing are each carried out by using a mixed solution of hydrochloric acid and methanol. However, when the deashing and washing are carried out with the mixed solution of hydrochloric acid and methanol, an acid-resistant equipment is required as an equipment for washing so that special steel or a tank subjected to glass lining must be used whereby the problem that costs of equipments become expensive is present.

Also, in the polymer product obtained by washing with the mixed solution of hydrochloric acid and methanol, a minute amount of a halogen compound is present so that it causes the problem of occurring mold corrosion, or coloring to black when a heat resistant test for a long period of term is carried out. Further, when the catalytic component contains halogen, the halogen reacts with an alcohol to form a corrosive component such as hydrochloric acid so that it is not preferred.

While the styrene polymer having a syndiotactic configuration can be produced by a slurry polymerization, a bulk polymerization, etc., it is advantageous to effect the polymerization with high content of styrene in view of the points of catalyst activity and productivity. Also, it has been desired to decrease the catalytic component remained in the resulting polymer product by deashing.

However, in a polymer product which is low in a conversion rate or polymerized by making low styrene concentration, deashing can be easily effected, but in the case of a polymer product with a high conversion rate of 60% or more, there is the problem that deashing and washing thereafter become difficult with increase of the conversion rate.

The present inventors have proceeded with consideration from such a point of view and investigated intensive studies to develop a process which can effect deashing (removal of residual catalyst) of a styrene polymer which is a high conversion rate effectively and can purify it to high purity.

SUMMARY OF THE INVENTION

An object of the present invention is to provide a process having no problem in corrosion of treating installments, capable of decreasing a cost for the treating equipments, and also, which can obtain a high purity styrene polymer product showing good characteristics and stable color hue, and having no corrosive property.

Also, the other object of the present invention is to provide a process for purifying a styrene polymer with high conversion rate by deashing (removal of residual catalyst) effectively to obtain a high purity styrene polymer product.

That is, the present invention is to provide a process for purification of a styrene polymer (Purification process I) which comprises, for purifying a styrene polymer having a high degree of syndiotacticity obtained by using a catalyst comprising (A) aluminoxane and (B) a transition metal compound containing no halogen, deashing the above styrene polymer with an alcoholic alkaline solution and then washing with an alcohol.

Also, the present invention is to provide a process for purification of a styrene polymer (Purification process II) which comprises, for purifying the styrene polymer having a high degree of syndiotacticity obtained by using the catalyst comprising the above components (A) and (B), deashing the styrene polymer after swelling the above styrene polymer having been produced with a conversion rate of 60% or more by adding an aromatic solvent and/or a styrene monomer.

DESCRIPTION OF THE PREFERRED EMBODIMENTS

The aluminoxane which is Component (A) of the catalyst to be used in the present invention is a material obtained by contacting various organoaluminum compound and a condensing agent. As the organoaluminum compound to be used as a starting material for reaction, there may be usually mentioned an organoaluminum compound represented by the formula:

$$AlR^1_3 \qquad (I)$$

wherein $R^1$ represents an alkyl group having 1 to 8 carbon atoms, more specifically trimethylaluminum, triethylaluminum, triisobutylaluminum, etc., and of these, trimethylaluminum is most preferred.

To the other hand, as the condensing agent to be condensed with the organoaluminum compound, water can be mentioned as typical example but any material which can conduct a condensation reaction with the alkylaluminum may be used other than the above.

The aluminoxane as the Component (A) includes chain-like alkylaluminoxanes represented by the formula:

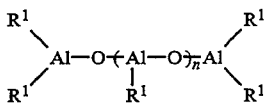

wherein n represents a polymerization degree and a number of 2 to 50 and $R^1$ represents an alkyl group having 1 to 8 carbon atoms, or cyclic alkylaluminoxanes having a recurring unit represented by the formula:

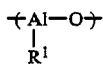

Of these alkylaluminoxanes, that wherein $R^1$ is a methyl group, i.e. methylaluminoxane is particularly preferred.

The contacted product of the alkylaluminum compound such as trialkylaluminum and water is usually a mixture of the above chain-like alkylaluminoxane or cyclic alkylaluminoxane and unreacted trialkylaluminum or various condensed products, or further molecules in which the above compounds or products are complicatedly associated, and it becomes various products depending on the conditions of contact of the alkylaluminum compound and water.

The reaction between alkylaluminum and water at this time is not particularly limited and carried out according to the known method. For example, there are methods such as (1) the method in which alkylaluminum is dissolved in an organic solvent and the solution is contacted with water, (2) the method in which alkylaluminum is added prior to polymerization, and then water is added thereto, and (3) the method in which water of crystallization contained in a metal salt or adsorbed water to an inorganic material or an organic material is reacted with alkylaluminum. In the above water, amine such as ammonia and ethylamine, sulfur compound such as hydrogen sulfide and a phosphorus compound such as phosphite ester may be contained with an amount up to 20%.

The aluminoxanes, especially alkylaluminoxanes to be used in the present invention are preferably those in which, when a hydrated compound is used after the above contact reaction, solid residue was filtered and the filtrate is heated under the conditions of an atmospheric pressure or a reduced pressure and a temperature of 30° to 200° C., preferably 40° to 150° C. for 20 minutes to 8 hours, preferably 30 minutes to 5 hours while removing the solvent. For carrying out the heat treatment, the temperature may be determined optionally depending on the various conditions, but usually the above range can be used. If the temperature is less than 30° C., effects cannot be obtained while if it exceeds 200° C., aluminoxane itself is pyrolyzed. Depending on the conditions of the heat treatment, the reaction product can be obtained in the state of colorless solid or solution. The product thus obtained can be used as a catalyst solution, if necessary, by dissolving or diluting with a hydrocarbon solvent.

Suitable examples of the alkylaluminoxane are those having high magnetic field component of methyl proton signal region based on aluminum-methyl group (Al—CH3) bonding measured by the proton nuclear magnetic resonance absorption method of 50% or less. That is, when proton nuclear magnetic resonance ($^1$H-NMR) spectrum of the above catalytic product is measured at room temperature in toluene solvent, a methyl proton signal based on Al—CH3 can be observed in the range of 1.0 to −0.5 ppm based on tetramethyl silane (TMS) standard. Since the proton signal (0 ppm) of TMS is in the range in which the methyl proton signal based on Al—CH3 is measured by using a methyl proton signal at 2.35 ppm of toluene as standard, which is measured based on TMS. When the measured signal is divided into a high magnetic field component (i.e. −0.1 to −0.5 ppm) and the other magnetic field component (i.e. 1.0 to −0.1 ppm), those having said high magnetic field component of 50% or less, preferably 45 to 5% based on the whole component are preferably used as the alkylaluminoxane of the present invention.

As the transition metal compound containing no halogen atom which is Component (B) of the catalyst to be used in the present invention, there may include a titanium compound, a zirconium compound, hafnium compound or a vanadium compound. The titanium compound includes various ones and preferably at least one compound selected from a titanium compound and a titanium chelate compound represented by the formula:

or

wherein $R^2$, $R^3$, $R^4$ and $R^5$ each represent a hydrogen atom, an alkyl group having 1 to 20 carbon atoms, an alkoxy group having 1 to 20 carbon atoms, an aryl group having 6 to 20 carbon atoms, an alkylaryl group, an arylalkyl group, an acyloxy group having 1 to 20 carbon atoms, a cyclopentadienyl group, a substituted cyclopentadienyl group or an indenyl group; a, b and c each are an integer of 0 to 4; and d and e each are an integer of 0 to 3.

$R^2$, $R^3$, $R^4$ and $R^5$ in the formula (IV) or (V) each represent a hydrogen atom, an alkyl group having 1 to 20 carbon atoms (specifically, methyl group, ethyl group, propyl group, butyl group, amyl group, isoamyl group, isobutyl group, octyl group, 2-ethylhexyl group, etc.), an alkoxy group having 1 to 20 carbon atoms (specifically, methoxy group, ethoxy group, propoxy group, butoxy group, amyloxy group, hexyloxy group, 2-ethylhexyloxy group, etc.), an aryl group having 6 to 20 carbon atoms, an alkylaryl group and an arylalkyl group (specifically, phenyl group, tolyl group, xylyl group, benzyl group, etc.), an acyloxy group having 1 to 20 carbon atoms (specifically, heptadecylcarbonyloxy group, etc.), a cyclopentadienyl group and a substituted cyclopentadienyl group (specifically, methylcyclopentadienyl group, 1,2-dimethylcyclopentadienyl group, pentamethylcyclopentadienyl group, etc.) or an indenyl group. These $R^2$, $R^3$, $R^4$ and $R^5$ may be the same or different with each other. Further, a, b and c each are an integer of 0 to 4, and d and e each are an integer of 0 to 3.

More preferred titanium compound include a titanium compound represented by the formula:

wherein R represents a cyclopentadienyl group, a substituted cyclopentadienyl group or an indenyl group; X, Y and Z are independently a hydrogen atom, an alkyl group having 1 to 12 carbon atoms, an alkoxy group having 1 to 12 carbon atoms, an aryl group having 6 to 20 carbon atoms, an aryloxy group having 6 to 20 carbon atoms or an arylalkyl group having 6 to 20 carbon atoms.

The substituted cyclopentadienyl group represented by R in the above formula is, for example, a cyclopentadienyl group substituted by at least one of an alkyl group having 1 to 6 carbon atoms, more specifically, methylcyclopentadienyl group, 1,2-dimethylcyclopentadienyl group, pentamethylcyclopentadienyl group, and the like. Also, X, Y, and Z are each independently a hydrogen atom, an alkyl group having 1 to 12 carbon atoms (specifically, methyl group, ethyl group, propyl group, n-butyl group, isobutyl group, amyl group, isoamyl group, octyl group, 2-ethylhexyl group, etc.), an alkoxy group having 1 to 12 carbon atoms (specifically, methoxy group, ethoxy group, propoxy group, butoxy group, amyloxy group, hexyloxy group, octyloxy group, 2-ethylhexyloxy group, etc.), an aryl group having 6 to 20 carbon atoms (specifically, phenyl group, naphthyl group, etc.), an aryloxy group having 6 to 20 carbon atoms (specifically, phenoxyl group, etc.) or an arylalkyl group having 6 to 20 carbon atoms (specifically, benzyl group).

Specific examples of the titanium compound represented by the formulas (VI) include cyclopentadienyltrimethyltitanium, cyclopentadienyltriethyltitanium, cyclopentadienyltripropyltitanium, cyclopentadienyltributyltitanium, methylcyclopentadienyltrimethyltitanium, 1,2-dimethylcyclopentadienyltrimethyltitanium, 1,3-dimethylcyclopentadienyltrimethyltitanium, 1,3,4-trimethylcyclopentadienyltrimethyltitanium, pentamethylcyclopentadienyltrimethyltitanium, pentamethylcyclopentadienyltriethyltitanium, pentamethylcyclopentatripropyltitanium, pentamethylcyclopentadienyltributyltitanium, cyclopentadienyltitanium trimethoxide, cyclopentadienyltitanium triethoxide, cyclopentadienyltitanium tripropoxide, cyclopentadienyltitanium triphenoxide, pentamethylcyclopentadienyltitanium trimethoxide, pentamethylcyclopentadienyltitanium triethoxide, pentamethylcyclopentadienyltitanium tripropoxide, pentamethylcyclopentadienyltitanium tributoxide, pentamethylcyclopentadienyltitanium triphenoxide, cyclopentadienyltribenzyltitanium, pentamethylcyclopentadienylmethyldiethoxytitanium, indenyltitanium trimethoxide, indenyltitanium triethoxide, indenyltrimethyltitanium, indenyltribenzyltitanium, and the like.

Of these titanium compounds, a titanium compound having one π electron type ligand as mentioned above is particularly preferred.

Further, as the titanium compound, a condensed titanium compound represented by the following formula can be used.

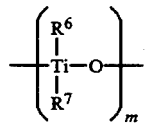

(VII)

wherein $R^6$ and $R^7$ each represent an alkoxy group having 1 to 20 carbon atoms or an acyloxy group; and m is an integer of 2 to 20.

Further, a titanium compound containing nitrogen, sulfur, phosphorus, silicon, etc. in the ligand may be used. Also, as the ligand, other than the single site ligand, a multisite ligand wherein ligands are combined with each other such as 2-sited, 3-sites, etc.

Also, the zirconium compound as the transition metal compound include tetrabenzylzirconium, zirconium tetraethoxide, zirconium tetrabutoxide, cyclopentadienylzirconium trimethoxide, cyclopentadienylzirconium triphenoxide, pentamethylcyclopentadienylzirconium trimethoxide and the like, and the hafnium compound include tetrabenzylhafnium, hafnium tetraethoxide, hafnium tetrabutoxide, cyclopentadienylhafnium trimethoxide, pentamethylcyclopentadienylhafnium trimethoxide and the like, and further the vanadium compound include vanadium bisacetylacetonato, vanadium triacetylacetonato, triethoxyvanadium, tripropoxyvanadium and the like.

In the process of the present invention, if desired, in addition to the above transition metal compound, other catalytic components such as organic aluminum can be added.

The organic aluminum include an organic aluminum compound represented by the formula:

(VIII)

wherein $R^8$ and $R^9$ each independently represent an alkyl group having 1 to 8 carbon atoms, preferably 1 to 4 carbon atoms; k is $0<k\leq 3$, m is $0\leq m<3$, p is $0\leq p<3$, and $k+m+p=3$.

By adding the above compound, activity is further enhanced.

As the organic aluminum compound represented by the above formula (VIII), the following can be exemplified. Those corresponding to p=0 are represented by the formula:

(wherein $R^8$ and $R^9$ are the same as mentioned above and k is preferably a number of $1.5\leq k\leq 3$). Those corresponding to m=0 are represented by the formula:

(wherein $R^8$ is the same as mentioned above and k is preferably a number of $2\leq k<3$).

In the organic aluminum compound represented by the above formula (VIII), the compound wherein p=0 and k=3 is selected from, for example, trialkylaluminum such as triethylaluminum, tributylaluminum, etc. or combination thereof, and preferred are triethylaluminum, tri-n-butylaluminum and triisobutylaluminum. In case of p=0 and $1.5\leq k<3$, included are dialkylaluminum alkoxide such as diethylaluminum ethoxide, dibutylaluminum butoxide, etc.; alkylaluminumsesquialkoxide such as ethylaluminumsesquiethoxide, butylaluminumsesquibutoxide, etc.; as well as partially alkoxylated alkylaluminum having an average composition represented by $R^8{}_{2.5}Al(OR^9)_{0.5}$ and the like. Examples of the compound corresponding to the case where m=0 include a partially hydrogenated alkylaluminum including dialkylaluminum hydride (k=2) such as diethylaluminum hydride, dibutylaluminum hydride, etc.; and alkylaluminum dihydride (m=k) such as ethylaluminum dihydride, propylaluminum dihydride, etc.

Of these, particularly suitable are triisobutylaluminum and diisobutylaluminum hydride.

The catalyst to be used in the present invention comprises the aforesaid Components (A) and (B) as main components, and other catalytic component than the above may be added, if desired. Compositional ratios of Component (A) and Component (B) in the catalyst are different depending on various conditions and cannot be determined fixedly, but usually it is as a ratio of aluminum in Component (A) and a metal in Component (B), i.e. as aluminum/metal (molar ratio), 1 to $10^6$, preferably 10 to $10^4$.

For preparation of the styrene polymer, a styrene monomer(s) is polymerized (or copolymerized) in the presence of the catalyst comprising the above Components (A) and (B) as main components. Here, the styrene monomer to be used in the present invention is styrene and/or a styrene derivative. Specific examples of the styrene derivative include alkylstyrenes such as p-methylstyrene, m-methylstyrene, o-methylstyrene, 2,4-dimethylstyrene, 2,5-dimethylstyrene, 3,4-dimethylstyrene, 3,5-dimethylstyrene, p-ethylstyrene, m-ethylstyrene, p-tert-butylstyrene, etc.; halogenated styrenes such as p-chlorostyrene, m-chlorostyrene, o-chlorostyrene, p-bromostyrene, m-bromostyrene, o-bromostyrene, p-fluorostyrene, m-fluorostyrene, o-fluorostyrene, o-methyl-p-fluorostyrene, etc.; alkoxystyrenes such as p-methoxystyrene, m-methoxystyrene, o-methoxystyrene, p-ethoxystyrene, m-ethoxystyrene, o-ethoxystyrene, etc.; carboxyester styrenes such as p-carboxymethylstyrene, m-carboxymethylstyrene, o-carboxymethylstyrene, etc.; an alkylether styrenes such as p-vinylbenzylpropyl ether, etc. or a mixture of two or more kinds of these.

Polymerization (or copolymerization) of the styrene monomer may be bulk polymerization and may be carried out in the presence of a solvent, e.g. an aliphatic hydrocarbon such as pentane, hexane, heptane, etc.; an alicyclic hydrocarbon such as cyclohexane, etc.; and an aromatic hydrocarbon such as benzene, toluene, xylene, etc.

Also, the polymerization temperature is not particularly limited, but usually 0° to 100° C., preferably 20° to 80° C.

Further, in order to control the molecular weight of the resulting styrene polymer, it is effective to carry out the polymerization reaction in the presence of hydrogen.

The styrene polymer thus obtained has a syndiotactic configuration with a high degree. Here, the styrene polymer having a high degree of syndiotacticity means that its stereochemical structure is the syndiotactic configuration with a high degree, i.e. the stereostructure in which phenyl groups or substituted phenyl groups as side chains are located alternately at opposite directions relative to the main chain consisting of carbon-carbon bonds. The tacticity is quantitatively determined by the nuclear magnetic resonance method ($^{13}$C-NMR method) using carbon isotope. The tacticity as determined by the $^{13}$C-NMR method can be indicated in terms of proportions of structural units continuously connected to each other, i.e. a diad in which two structural units are connected to each other, a triad in which three structural units are connected to each other and a pentad in which five structural units are connected to each other. The styrene polymers having such a high degree of syndiotacticity usually means polystyrene, poly(alkylstyrene), poly(halogenated styrene), poly(alkoxystyrene), poly(vinyl benzoate) and the mixtures thereof, and copolymers containing these as main components, each of which has the proportion of racemic diad of at least 75% and preferably at least 85%, or the proportions of racemic pentad of at least 30% and preferably at least 50%. Here, the poly(alkylstyrene) includes poly(methylstyrene), poly(ethylstyrene), poly(isopropylstyrene), poly(tert-butylstyrene), etc., and the poly(halogenated styrene) includes poly(chlorostyrene), poly(bromostyrene), poly(fluorostyrene), etc. Also, the poly(alkoxystyrene) includes poly(methoxystyrene), poly(ethoxystyrene), etc. Of these, particularly preferred styrene polymer includes polystyrene, poly(p-methylstyrene), poly(m-methylstyrene), poly(p-tert-butylstyrene), poly(p-chlorostyrene), poly(m-chlorostyrene), poly(p-fluorostyrene), and further a copolymer of styrene and p-methylstyrene.

In the purification method I of the present invention, prior to effecting deashing treatment, polymerization reaction is stopped and the catalyst is deactivated by using, if necessary, an alcohol under inert gas atmosphere. Here, as the inert gas, nitrogen gas, argon gas, etc. can be used. This is because when it is contacted with air, deashing becomes difficult or a product is colored depending on the situation. Also, as the alcohol, an alcohol having 1 to 8 carbon atoms such as methanol, ethanol, n-propanol, isopropanol, n-butanol, etc. can be used. As the method of adding the alcohol, there may be mentioned, in addition to the method in which an alcohol liquid is added, the method in which deactivation is carried out by using an alcohol vapor and the method in which an alcoholic alkaline solution is used, and the like. An amount of the alcohol to be added may be a metal-alkyl bonded amount of the substantially used catalytic component or more.

The styrene polymer produced by the process of the present invention has usually a number average molecular weight of 1,000 to 5,000,000, preferably 50,000 to 4,000,000 and has high syndiotacticity as mentioned above.

In the purification method I of the present invention, it is necessary to carry out the deashing treatment of the resulting styrene polymer by using an alcoholic alkaline solution after polymerization of the styrene monomer using the above catalyst. Here, as the alcohol of the alcoholic alkaline solution, there may be mentioned an alcohol having 1 to 8 carbon atoms such as methanol, ethanol, n-propanol, isopropanol, n-butanol, etc. These may be the same or different as the alcohol to be used as the deactivating agent as mentioned above. Of these, an alcohol which can easily dissolve an alkali, i.e. a linear alcohol is preferred. Since methanol has high dissolving power of an alkali, it is particularly preferred. Also, as the alkali, there may be mentioned sodium hydroxide and potassium hydroxide, and of these, sodium hydroxide is suitable. It may be possible to add an alkali after adding an alcohol to the resulting polymer or add an alcoholic alkaline solution wherein an alkali is previously dissolved. However, when dissolution takes much time, it is preferred to add an alcoholic alkaline solution wherein an alkali is previously dissolved. The alcoholic alkaline solution is usually used as a solution containing 0.05 to 15% by weight, preferably 0.1 to 5% by weight of the alkali in an alcohol. If an amount of the alkali is less than 0.05% by weight, deashing effect cannot be revealed, while it exceeds 15% by weight, a large mount of alcohol is required for washing an alkali component used whereas deashing effect is revealed.

As an amount of an alcoholic alkaline to be added to the polymer, an amount of stoichiometrically decomposing a catalyst component contained in the polymer or more is required. The amount of the alkali used is usually 0.5 g to 500 g, preferably 10 g to 100 g per 1 kg of the polymer. A treating temperature may be employed in the range of 0° C. to the boiling point of an alcohol and it is usually treated at 20° C. to 50° C.

In the purification method I of the present invention, after the deashing treatment as mentioned above, washing with an alcohol is carried out. Here, as the alcohol, it may be the same as or different from the alcohol used in the deashing treatment.

By such a treatment, a high purity styrene polymer having no corrosiveness and a high degree of syndiotacticity can be obtained.

Next, in the purification method II of the present invention, it is preferred to carry out polymerization with a styrene monomer concentration of 50% by volume or more, more preferably to carry out polymerization with that of 70% by volume or more. In the slurry polymerization, it is preferred to carry out the polymerization by using an aromatic hydrocarbon solvent since a polymer having a high bulk density and good in deashing property due to the impregnating property of the aromatic solvent to the polymer. Also, the bulk polymerization is more preferred since it is excellent in productivity and impregnating property as mentioned above.

In the purification method II of the present invention, polymerization is carried out until reaching the conversion rate of 60% or higher, preferably 70% or higher. The conversion rate can be controlled by changing the polymerization conditions such as the catalyst to be used, polymerization temperature, time, etc.

In the purification method II of the present invention, deashing and washing are carried out after swelling the polymer by adding an aromatic solvent and/or the styrene monomer as mentioned above (provided that the monomer is not necessarily the same as the styrene monomer corresponding to the styrene polymer produced) to the styrene polymer produced with a conversion rate of 60% or more as mentioned above. At the time of the swelling treatment, an aromatic solvent and/or the styrene monomer as mentioned above containing a small amount of a deactivating agent such as an alcohol, etc. can be used. Here, as the aromatic solvent, benzene, toluene, ethylbenzene, cumene, xylene, etc. can be used. Such an aromatic solvent or styrene monomer should be added so as to become the swelling degree of the polymer of 2 or less, preferably 1.8 or less, particularly in the range of 0.4 to 1.35. Swelling is usually carried out at 0° to 100° C., preferably 20° to 80° C. Here, the selling degree is that calculated from the following formula.

$$\text{Swelling degree} = \frac{\text{Amount of polymer (kg)}}{\text{Unreacted monomer + Solvent (liter)}}$$

wherein solvent means not only the aromatic solvent but also styrene monomer added.

The styrene polymer swelled by adding the aromatic solvent and/or styrene monomer with the ratio as mentioned above is subjected to deashing treatment by treating with a washing solution containing, for example, a mixture of hydrochloric acid and alcohol having 1 to 8 carbon atoms (preferably methanol) (concentration of hydrochloric acid is 0.05 to 15% by weight or so) or a mixture of sodium hydroxide or potassium hydroxide and an alcohol having 1 to 8 carbon atoms (preferably methanol) (concentration of sodium hydroxide or potassium hydroxide is 0.05 to 15% by weight or so), etc., and then washing and drying under reduced pressure to obtain an extremely high purity styrene polymer having a high degree of syndiotacticity with a content of metal such as Al being 300 ppm or less.

Further, if necessary, the polymer may be treated by washing with a solvent such as methyl ethyl ketone, etc. to remove a soluble content and then the resulting insolubles may be further treated with chloroform, etc.

According to the present invention, since no corrosive material is used in the deashing treatment, any specific facility is not required at deashing and the polymer product obtained by purification does not have any corrosive property so that corrosion of a mold, etc. is not caused when molding. Also, according to the present invention, there is no fear in corrosion, and deashing and washing can be carried out with high degree and also a high purity styrene polymer with stable color hue can be obtained with a low cost.

Further, according to the present invention, since a styrene polymer polymerized under the conditions of high concentration and high conversion rate of the styrene monomer can be deashed and washed with good efficiency, a high purity styrene polymer can be obtained whereby productivity of the high purity styrene polymer can be markedly improved.

Accordingly, the present invention has markedly high industrial value as a process for producing a styrene polymer having a high degree of syndiotacticity with high purity and good efficiency.

Next, the present invention is described in greater detail with reference to the following examples.

EXAMPLE 1

In a 2 L(L=liter) autoclave replaced with nitrogen was charged 400 ml of styrene, and after elevating to 70° C., 4 millimoles(mmole) of triisobutylaluminum and 4 mmole of methylaluminoxane were charged as catalyst components. After stirring for 30 minutes, 0.02 mmole of pentamethylcyclopentadienyltitanium trimethoxide was added as a catalyst component and polymerization was carried out at 70° C. for 2 hours.

Then, the reaction was stopped by adding 50 ml of methanol under nitrogen atmosphere to deactivate the catalyst. The resulting polymer was transferred to a 5 L vessel, and deashing treatment was carried out by adding 2 L of methanol and 20 g of sodium hydroxide, and stirring at room temperature for 2 hours. After filtration, 2 L of methanol was then newly added and the mixture was stirred at room temperature for one hour, then washed and filtered. After this washing procedure was further repeated once, it was filtered and dried.

A yield of the polymer obtained by carrying out such purification treatment was 120.2 g. With respect to the polymer, metal analyses were carried out and the results gave that Ti could be decreased to 2 ppm or less and Al to 40 ppm. However, in the polymer in which deashing was not carried out, 8.0 ppm of Ti and 1800 ppm of Al were contained.

EXAMPLE 2

The same procedure was carried out as in EXAMPLE 1 except for using n-butanol in place of methanol in the deactivating treatment, deashing and washing operations to obtain a polymer with a Ti content of 2 ppm and an Al content of 61 ppm.

EXAMPLE 3

The same procedure was carried out as in EXAMPLE 1 except for deactivating with n-butanol and then deashing and washing with methanol to obtain a polymer with a Ti content of 2 ppm and an Al content of 51 ppm.

COMPARATIVE EXAMPLE 1

The same procedure was carried out as in EXAMPLE 1 except for using 20 ml of hydrochloric acid in place of 20 g sodium hydroxide to obtain a polymer with a Ti content of 2 ppm or less and an Al content of 20 ppm. However, when the resulting polymer was applied to heat aging test (200° C. for 24 hours in air), the polymer became blackish.

To the contrary, when the samples of the polymer of the above EXAMPLES 1 to 3 were tested in the same manner, they merely showed color change to pale yellow or so.

COMPARATIVE EXAMPLE 2

In a 2 L autoclave replaced with nitrogen was charged 400 ml of styrene, and after elevating to 70° C., 4 mmole of triisobutylaluminum and 4 mmole of methylaluminoxane were charged as catalyst components. After stirring for 30 minutes, 0.02 mmole of pentamethylcyclopentadienyltitanium trimethoxide was added as a catalyst component and polymerization was carried out at 70° C. for one hour. Subsequently, 4 mmole of triisobutylaluminum, 4 mmole of methylaluminoxane and 0.02 mmole of pentamethylcyclopentadienyltitanium trimethoxide were added thereto and polymerization was further continued for 4 hours.

Then, the reaction was stopped by adding 50 ml of methanol to deactivate the catalyst, and the resulting polymer was transferred to another vessel and 2 L of methanol and 20 g of sodium hydroxide were added thereto and stirring was carried out at room temperature for 2 hours. After filtration, 2 L of methanol was then newly added and stirring was carried out at room temperature for one hour to effect washing. After this washing procedure was further repeated once, it was filtered and dried.

When metal analyses were carried out with respect to the resulting polymer, deashing could not substantially be effected and 8 ppm of Ti and 1200 ppm of Al were contained. A yield of the polymer was 260.4 g and a conversion rate was 72.3%.

EXAMPLE 4

In COMPARATIVE EXAMPLE 2, after swelling was effected with a swelling degree of 0.84 by adding 200 ml of styrene after polymerization and by stirring at 70° C. for one hour, the same deashing and washing operations as in the above COMPARATIVE EXAMPLE 2 were carried out.

When metal analyses were carried out with respect to the resulting polymer, only 3 ppm of Ti and 200 ppm of Al were contained.

EXAMPLE 5

A post-treatment was carried out in the same manner as in EXAMPLE 4 except for adding 200 ml of ethylbenzene in place of styrene after polymerization.

When metal analyses were carried out with respect to the resulting polymer, only 3 ppm of Ti and 170 ppm of Al were contained.

EXAMPLE 6

A post-treatment was carried out in the same manner as in EXAMPLE 4 except for adding 400 ml of ethylbenzene in place of styrene after polymerization.

When metal analyses were carried out with respect to the resulting polymer, only 2 ppm of Ti and 150 ppm of Al were contained.

EXAMPLE 7

After polymerization was carried out in the same manner as in COMPARATIVE EXAMPLE 2, 200 ml of toluene was added and stirring was carried out at 70° C. for one hour to effect swelling with a swelling degree of 0.84.

Thereafter, the catalyst was deactivated with 50 ml of methanol, and the resulting polymer was transferred to another vessel and 2 L of methanol and hydrochloric acid were added thereto and stirring was carried out at room temperature for 2 hours. After filtration, 2 L of methanol was then newly added and stirring was carried out at room temperature for one hour to effect washing. After this washing procedure was further repeated once, it was filtered and dried.

When metal analyses were carried out with respect to the resulting polymer, only 3 ppm of Ti and 150 ppm of Al were contained.

What is claimed is:

1. In a process for the purification of a styrene polymer having a high degree of syndiotacticity obtained by carrying out a polymerization with a catalyst comprising (A) an aluminoxane and (B) a transition metal compound which does not contain halogen, the improvement which comprises deashing the styrene polymer with an alcoholic alkaline solution and then washing the styrene polymer with an alcohol.

2. The process for the purification of a styrene polymer according to claim 1, which further comprises deactivating the catalyst by contacting the catalyst with an alcohol under an inert gas atmosphere prior to said deashing.

3. The process for the purification of a styrene polymer according to claim 1, wherein the alcoholic alkaline solution is a solution containing 0.1 to 15% by weight of an alkali in an alcohol.

4. The process for the purification of a styrene polymer according to claim 1, wherein an alcohol of the alcoholic alkaline solution is an alcohol having 1 to 8 carbon atoms.

5. The process for the purification of a styrene polymer according to claim 1, wherein the transition metal compound is a titanium compound, a zirconium compound, a hafnium compound or a vanadium compound.

6. The process for the purification of a styrene polymer according to claim 1, wherein the aluminoxane compound is (a) an alkylaluminoxane of the formula:

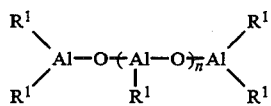

wherein n is a polymerization degree of 2 to 50 and $R^1$ is an alkyl group having 1 to 8 carbon atoms, or
(b) a cyclic alkylaluminoxane having a recurring unit of the formula:

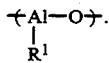

7. The process for the purification of a styrene polymer according to claim 1, wherein the aluminoxane is methylaluminoxane.

8. The process for the purification of a styrene polymer according to claim 6, wherein the transition metal compound is selected from the group consisting of cyclopentadienyltrimethyltitanium, cyclopentadienyltriethyltitanium, cyclopentadienyltripropyltitanium, cyclopentadienyltributyltitanium, methylcyclopentadienyltrimethyltitantum, 1,2-dimethylcyclopentadienyltrimethyltitanium, 1,3-dimethylcyclopentadienyltrimethyltitanium, 1,3,4-trimethylcyclopentadienyltrimethyltitanium, pentamethylcyclopentadienyltrimethyltitanium, pentamethylcyclopentadienyltriethyltitanium, pentamethylcyclopentatripropyltiatinum, pentamethylcyclopentadienyltributyltitanium, cyclopentadienyltitanium trimethoxide, cyclopentadienyltitanium triethoxide, cyclopentadineyltitanium tripropoxide, cyclopentadineyltitanium triphenoxide, pentamethylcyclopentadineyltitanium trimethoxide, pentamethylcyclopentadineyltitanium triethoxide, pentamethylcyclopentadienyltitanium tripropoxide, pentamethylcyclopentadienyltitanium tributoxide, pentamethylcyclopentadienyltitanium triphenoxide, cyclopentadienyltribenzyltitanium, pentamethylcyclopentadienylmethyldiethoxytitanium, indenyltitanium trimethoxide, indenyltitanium triethoxide, indenyltrimethyltitanium, indenyltribenzyltitanium, tetrabenzylzirconium, zirconium tetraethoxide, zirconium tetrabutoxide, cyclopentadienylzirconium trimethoxide, cyclopentadienylzirconium triphenoxide, pentamethylcyclopentadienylzirconium trimethoxide, tetrabenzylhafnium, hafnium tetraethoxide, hafnium tetrabutoxide, cyclopentadienylhafnium trimethoxide, pentamethylcyclopentadienylhafnium trimethoxide, vanadium bisacetylacetonato, vanadium triacetylacetonato, triethoxyvanadium and tripropoxyvanadium.

9. The process for the purification of a styrene polymer according to claim 8, wherein the alcoholic alkaline solution is a solution containing 0.1 to 15% by weight of an alkali in an alcohol.

10. The process for the purification of a styrene polymer according to claim 9, wherein the deashing is carried out at a temperature of 20° C. to 50° C.

11. The process for the purification of a styrene polymer according to claim 10, wherein the alcoholic alkaline solution contains (a) an alcohol selected from the group consisting of methanol, ethanol, n-propanol, isopropanol and n-butanol, and (b) an alkali compound selected from the group consisting of sodium hydroxide and potassium hydroxide.

12. The process for the purification of a styrene polymer according to claim 11, wherein the washing is carried out with an alcohol selected from the group consisting of methanol, ethanol, n-propanol, isopropanol and n-butanol.

13. The process for the purification of a styrene polymer according to claim 12, wherein the alcoholic alkaline is in an amount of 0.5 g to 500 g per g of the polymer.

14. The process for the purification of a styrene polymer according to claim 13 wherein the amount of alcoholic alkaline is 10 g to 100 g per 1 g of the polymer.

15. The process for the purification of a styrene polymer according to claim 14, wherein the aluminoxane is methylaluminoxane.

* * * * *